United States Patent
Boussant-Roux et al.

(10) Patent No.: US 7,687,422 B2
(45) Date of Patent: *Mar. 30, 2010

(54) HIGH RESISTIVITY REFRACTORY WITH A HIGH ZIRCONIA CONTENT

(75) Inventors: Yves Boussant-Roux, Lexington, VA (US); Isabelle Cabodi, Cavaillon (FR); Michel Gaubil, Les Angles (FR)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/280,166

(22) PCT Filed: Feb. 23, 2007

(86) PCT No.: PCT/FR2007/050843

§ 371 (c)(1), (2), (4) Date: Oct. 30, 2008

(87) PCT Pub. No.: WO2007/099253

PCT Pub. Date: Sep. 7, 2007

(65) Prior Publication Data

US 2009/0038936 A1  Feb. 12, 2009

(30) Foreign Application Priority Data

Feb. 24, 2006 (FR) .................. 06 01661
Oct. 16, 2006 (FR) .................. 06 54305

(51) Int. Cl.
*C04B 35/484* (2006.01)
(52) U.S. Cl. ..................... 501/105; 501/107
(58) Field of Classification Search .......... 501/105, 501/107
See application file for complete search history.

(56) References Cited

U.S. PATENT DOCUMENTS

| 5,023,218 A | | 6/1991 | Zanoli et al. |
| 5,028,572 A | * | 7/1991 | Kim et al. .................. 501/103 |
| 5,466,643 A | | 11/1995 | Ishino et al. |
| 2008/0076659 A1 | * | 3/2008 | Boussant-Roux et al. ... 501/105 |

FOREIGN PATENT DOCUMENTS

| EP | 0 403 387 B1 | | 10/1994 |
| FR | 1 208 577 | | 2/1960 |
| FR | 75 893 | | 7/1961 |
| FR | 82 310 E | | 1/1964 |
| FR | 2 701 022 A1 | | 8/1994 |
| JP | 2003-02560 | * | 10/2000 |
| WO | 2005/068393 A1 | | 7/2005 |

* cited by examiner

*Primary Examiner*—Karl E Group
(74) *Attorney, Agent, or Firm*—Young & Thompson

(57) ABSTRACT

A novel fused and cast refractory product with a high zirconia content having improved electrical resistivity includes, as a percentage by weight relative to the oxides and for a total of more than 98.5%:

| $ZrO_2 + Hf_2O$: | >85% |
| $SiO_2$: | 2% to 10% |
| $Al_2O_3$: | 0.1% to 2.4%, with $Al_2O_3/SiO_2$ <0.5 |
| $Y_2O_3$: | ≦1%, |
| $B_2O_3$: | <1.5%; and | a dopant selected from the group formed by $V_2O_5$, $CrO_3$, $Nb_2O_5$, $MoO_3$, $Ta_2O_5$, $WO_3$, and mixtures thereof, in a weighted quantity such that:

$0.2\% \leqq 2.43V_2O_5 + 8.84CrO_3 + 1.66Nb_2O_5 + 6.14MoO_3 + Ta_2O_5 + 3.81WO_3$.

31 Claims, No Drawings

HIGH RESISTIVITY REFRACTORY WITH A HIGH ZIRCONIA CONTENT

The invention relates to a novel fused and cast refractory product with a high zirconia content.

Refractory products include fused and cast products which are well known for the construction of glass fusion furnaces and sintered products.

Fused and cast products, as opposed to sintered products, usually include an intergranular vitreous phase connecting crystalline grains. Thus, problems with sintered products and fused and cast products and the technical solutions adopted to overcome them are generally different. A priori, then, a composition which has been developed for a sintered product cannot per se be used for a fused and cast product, and vice versa.

Fused and cast products, frequently termed electrofused products, are obtained by fusing a mixture of appropriate starting materials in an electric arc furnace or by any other technique which is suitable for such products. The molten liquid is then cast into a mold and the product obtained undergoes a controlled cooling cycle in order to be brought to ambient temperature without fracturing. That operation is termed an "annealing" in the art.

Fused and cast products include electrofused products with a high zirconia content, i.e. comprising more than 85% by weight of zirconia ($ZrO_2$), which are known for their quality of having very high corrosion resistance without discoloring the glass produced and without generating flaws.

Conventionally, fused and cast products with a high zirconia content also include sodium oxide ($Na_2O$) to prevent the formation of zircon from the zirconia and silica present in the product. Zircon formation is undesirable, as it is accompanied by a volume reduction of the order of 20%, thereby creating mechanical stresses which are the source of cracks.

Product ER-1195, which is produced and sold by the Société Européenne des Produits Réfractaires and disclosed in EP-B 403 387, is currently widely used in glass fusion furnaces. Its chemical composition comprises about 94% zirconia, 4% to 5% silica, about 1% alumina, 0.3% sodium oxide and less than 0.05% by weight of $P_2O_5$. It is typical of high zirconia content products used in glass furnaces.

FR2 701 022 describes fused and cast products with a high zirconia content which contain 0.05% to 1.0% by weight of $P_2O_5$ and 0.05% to 1.0% by weight of boron oxide $B_2O_3$ Such products have high electrical resistivity. They can advantageously stabilize electricity consumption during electric glass fusion and in particular can avoid any problems with short circuiting in refractories, causing their rapid degradation. During electric glass fusion, part of the electric current passes through the refractories, An increase in the resistivity of such refractory products can thus reduce the quantity of electric current which can pass through it.

WO-2005 068393 describes fused and cast products with a high zirconia content having high electrical resistivity, while minimizing the quantities of BaO, SrO, MgO, CaO, $P_2O_5$, $Na_2O$, and $K_2O$. Those products contain 0.1% to 1.2% by weight of $B_2O_3$.

Present developments towards very high quality glass, in particular glass for LCD type flat screens, increases demands for refractory products from glass fusion furnaces. In particular, there is a need for refractory products having further improved electrical resistivity while retaining good resistance to corrosion by the molten glass.

The present invention seeks to satisfy that need.

More particularly, it provides a fused and cast refractory product with a high zirconia content comprising, as percentages by weight relative to the oxides and for a total of more than 98.5%, preferably more than 99% and more preferably more than 99.5%:

| | |
|---|---|
| $ZrO_2 + Hf_2O$: | >85% |
| $SiO_2$: | 1% to 10% |
| $Al_2O_3$: | 0.1% to 2.4% |
| $B_2O_3$: | >1.5%; and | a dopant selected from the group formed by $V_2O_5$, $CrO_3$, $Nb_2O_5$, $MoO_3$, $Ta_2O_5$, $WO_3$ and mixtures thereof, in a weighted quantity expressed by the following formula (1):

$$0.2\% \leq 2.43V_2O_5 + 8.84CrO_3 + 1.66Nb_2O_5 + 6.14MoO_3 + Ta_2O_5 + 3.81WO_3$$

and preferably by the following formula (2):

$$0.2\% \leq 2.43V_2O_5 + 4.42CrO_3 + 1.66Nb_2O_5 + 3.07MoO_3 + Ta_2O_5 + 1.91WO_3$$

As shown below, surprisingly, the refractory product of the invention has a remarkable electrical resistivity while retaining good resistance to corrosion by the fused glass.

Preferably, the refractory product of the invention also exhibits one or, as is preferable, several of the following optional characteristics:
- the weighted quantity of dopant is 0.5% or more, preferably 0.6% or more, more preferably 1.2% or more and/or 3% or less, preferably 2.5% or less, more preferably 1.4% or less;
- the dopant is selected from $V_2O_5$, $Nb_2O_5$, $Ta_2O_5$, $WO_3$, and mixtures thereof, preferably from $Nb_2O_5$, $Ta_2O_5$, and mixtures thereof;
- the quantity of silica, $SiO_2$, is 2% or more, preferably 3% or more, preferably 3.8% or more, and/or 8% or less;
- the $Al_2O_3/SiO_2$ ratio is less than 0.5, preferably less than 0.3, and more Preferably less than 0.25. This characteristic is particularly advantageous when the silica content is less than 2%.
- the quantity of $B_2O_3$ is more than 0.05%, preferably more than 0.1%, and/or less than 1%. A quantity of $B_2O_3$ more than 0.1%, or more than 0.2%, or even more than 0.25%, is desirable, in particular, when $SiO_2 < 3\%$.
- the product does not contain $V_2O_5$.
- the quantity of yttrium oxide, $Y_2O_3$, is 1% or less, preferably less than 0.5%, more preferably less than 0.2%;
- the quantity of boron oxide, $B_2O_3$, is 1% or less, preferably less than 0.50%;
- the quantity of zirconia, $ZrO_2 + Hf_2O$, is 90% or more, preferably 93% or more;
- the quantity of alumina, $Al_2O_3$, is 0.5% or more, preferably 0.6% or more, and/or 1.5% or less, preferably 1% or less, even more preferably 0.85% or less;
- the refractory product has the following composition, with $ZrO_2 + HfO_2$ as the complement to 100%:

| | |
|---|---|
| $SiO_2$: | 3.8% to 4.8% |
| $B_2O_3$: | <0.25% |
| $Al_2O_3$: | 0.65% to 0.85% |
| $Y_2O_3$: | <0.45% | between 0.8% and 1.2% of $Ta_2O_5$ or between 0.4% and 0.9% of $Nb_2O_5$.
- the quantity of impurities (mainly iron, titanium, phosphorous, and calcium oxides) is less than 0.6%, preferably less than 0.3%.

Advantageously, these characteristics can further improve the electrical resistivity and corrosion resistance of the product of the invention.

The refractory product of the invention preferably has electrical resistivity of 200 Ω.cm [ohm.centimeter] or more, preferably 400 Ω.cm or more, more preferably 600 Ω.cm or more at 1500° C. and at a frequency of 100 Hz [hertz]. At 950° C., this resistivity may be 1000 Ω.cm or more, preferably 20000 Ω.cm or more, and more preferably 25000 Ω.cm or more. It may even be 28000 Ω.cm or more.

The invention also provides a glass fusion furnace including a refractory product of the invention, or a refractory product that is fabricated or capable of being fabricated using a method of the invention, in particular in regions intended to come into contact with the molten glass. In a furnace of the invention, the refractory product may advantageously form part of a cell for preparing the glass to be fused, in particular by electrical fusion, where it may come into contact with molten glass at a temperature of more than 1200° C.

The refractory product of the invention is not intended to come into contact with molten glass at temperatures below 1100° C.

The invention also provides an electrolysis cell, for example for the electrolysis of aluminum, comprising a plurality of refractory blocks, at least one of said blocks being a refractory product of the invention or a refractory product fabricated or capable of being fabricated using a method of the invention. In particular, this product may form part of the side wall of the cell. It may be disposed in a region where it may come into contact with molten cryolite.

Finally, the invention provides a process for fabricating a refractory product of the invention, the process comprising the following steps in succession:

a) mixing the starting materials, including introducing a dopant, to form a starting charge;

b) fusing said starting charge to obtain a molten liquid; and c) casting and solidifying said molten liquid by controlled cooling to obtain a refractory product; said process being remarkable in that said starting materials are selected so that the refractory product is in accordance with the invention.

The amount or "weighted" quantity of dopant as used here designates the quantity:

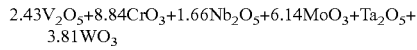

$2.43V_2O_5 + 8.84CrO_3 + 1.66Nb_2O_5 + 6.14MoO_3 + Ta_2O_5 + 3.81WO_3$ and preferably the quantity:

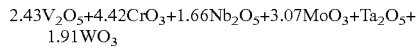

$2.43V_2O_5 + 4.42CrO_3 + 1.66Nb_2O_5 + 3.07MoO_3 + Ta_2O_5 + 1.91WO_3$ where the amounts of the oxides are expressed as percentages by weight.

Unless otherwise stated, all of the percentages in the present description are percentages by weight relative to the oxides.

In the fused and cast products of the invention, the high zirconia content, i.e. $ZrO_2 > 85\%$, enables the demand for high corrosion resistance both without discoloring the glass produced and not generating defects which may harm the quality of that glass to be satisfied.

Hafnium oxide, $HfO_2$, present in the product of the invention is the hafnium oxide which is naturally present in sources of zirconia. Its content in the product of the invention is thus 5% or less, generally 2% or less.

The presence of silica is necessary for the formation of an intergranular vitreous phase which can effectively accommodate variations in the volume of the zirconia during its reversible allotropic transformation, i.e. during the change from the monoclinic phase to the tetragonal phase. In contrast, the added silica must not exceed 10% since, because it is added to the detriment of the zirconia content, corrosion resistance would be reduced.

The presence of alumina is necessary for the formation of a stable vitreous phase and good flow characteristics of the products in the mold. An excessive amount would cause the vitreous phase to become unstable (crystal Formation).

Preferably, the product of the invention comprises a quantity of $B_2O_3$ which is 0.5% or less. Boron oxide actually has an unfavorable effect on the formation of zircon in the product. That element can improve the product feasibility.

Yttrium oxide, $Y_2O_3$, has an unfavorable effect on electrical resistivity, but its presence has to be tolerated in a quantity of less than 1%, preferably less than 0.5%, more preferably less than 0.2%.

The dopant has to be present in the products of the invention to improve the electrical resistivity. However, the total weighted content of said oxides preferably must not exceed 4% so that the percentage of zirconia is maintained at a level which is sufficiently high to ensure excellent resistance to corrosion by the molten glass and to keep the vitreous phase stable.

The inventors have established that all pentavalent dopants have a substantially identical effect in identical molar quantities. This is the same for all hexavalent dopants. Further, the inventors have observed a molar efficiency for hexavalent dopants $M^{6+}$ which is about double that for pentavalent dopants $M^{5+}$. Without wishing to be bound by a particular theory, the inventors explain this difference by the role the dopants play as regards oxygen voids in the zirconia. The hexavalent dopants $M^{6+}$ would in fact compensate for two oxygen voids, as opposed to a single void for the pentavalent dopants $M^{5+}$. One mole of an oxide of a pentavalent dopant $M_2O_5$ would thus have an identical effect to one mole of an oxide of a hexavalent dopant $MO_3$.

The weighted dopant content also takes into account differences between the molar masses of the dopants. Thus, 1.66 grams of $Ta_2O_5$ have an effect equivalent to one gram of $Nb_2O_5$.

The complement to 100% in the composition of the product of the invention is constituted by the other species. The term "other species" means species the presence of which is not particularly desirable and which are generally present in the starting materials as impurities.

Alkali oxides may be mentioned, in particular sodium oxide $Na_2O$ and potassium oxide $K_2O$, which may be tolerated but preferably must not exceed 0.5%, preferably 0.1%, and more preferably only be present in trace quantities. Otherwise, the electrical resistivity would be degraded due to the increased conductivity of the vitreous phase. Oxides of iron, titanium and phosphorus are known to be deleterious and their amount must be limited to traces introduced with the starting materials as impurities. Preferably, the quantity of $Fe_2O_3 + TiO_2$ is less than 0.55% and that of $P_2O_5$ is less than 0.05%.

A product of the invention may be fabricated in steps a) to c) described below:

a) mixing the starting materials, including introducing a dopant to form a starting charge;

b) fusing said starting charge to obtain a molten liquid; and c) solidifying said molten liquid by controlled cooling to obtain a refractory product in accordance with the invention.

In step a), the dopant is added to guarantee an amount of dopant in the finished product of the invention.

In step b), fusion is preferably carried out by the combined action of a relatively long electric arc, producing no reduction, and agitation to encourage re-oxidation of the products.

To minimize the formation of nodules with a metallic appearance and avoid the formation of cracks or crazing in the final product, it is preferable to carry out fusion under oxidizing conditions.

Preferably, the long arc fusion process described in French patent 1208577 and its patents of addition, numbers 75893 and 82310, is used.

That process consists of using an electric arc furnace the arc of which arcs between the charge and at least one electrode distanced from said charge; the length of said arc is adjusted so that its reducing action is reduced to a minimum while maintaining an oxidizing atmosphere above the fusion melt and agitating said melt either by the action of the arc itself or by blowing an oxidizing gas (air or oxygen, for example) into the melt, or by adding oxygen-releasing substances such as peroxides to the melt.

In step c), cooling is preferably carried out at a rate lower than 20° C. per hour, preferably at a rate of about 10° C. per hour.

Any conventional process for fabricating fused products based on zirconia intended for applications in glass fusion furnaces may be carried out, provided that the composition of the starting charge can produce products with a composition in accordance with that of the product of the invention.

The following non-limiting examples are given by way of illustration of the invention.

In the examples, the following starting materials were used:
zirconia principally containing, on average by weight, 98.5% of $ZrO_2+HfO_2$, 0.2% of $SiO_2$ and 0.02% of $Na_2O$;
zircon sand containing 33% silica;
AC44 type alumina sold by Pechiney and containing an average of 99.4% of alumina, $Al_2O_3$; and
oxides of boron, yttrium, tantalum $Ta_2O_5$ and niobium $Nb_2O_5$ with a purity of more than 99%.

The products 1 to 39 were prepared using a conventional arc furnace fusion process then cast to obtain blocks with dimensions of 220×450×150 mm millimeter.

The products 40 to 43 were manufactured using a method of fusion by induction, as described in document FR 1 430 962, with a 275 mm diameter turn, power lying in the range 120 kW to 220 kW, and a frequency delivered by the aperiodic generator lying in the range 100 kHz to 250 kHz.

The chemical analysis of the products obtained is given in Table 1: this mean chemical analysis is given as a percentage by weight.

In this table, an empty cell corresponds to a quantity of 0.05% by weight or less. (*) indicates that the example is outside the scope of the invention.

For the various examples of blocks which were produced, cylindrical bars 30 mm in diameter and 30 mm high of the product were subjected to a potential difference of 1 volt at a frequency of 100 Hertz at 1500° C. to carry out the measurements of electrical resistivity, R.

TABLE 1

| | $ZrO_2$ | $SiO_2$ | $B_2O_3$ | $Al_2O_3$ | $Al_2O_3/SiO_2$ | $Na_2O$ | $Nb_2O_5$ | $Ta_2O_5$ | $Y_2O_3$ | $Ta_2O_5 + 1.66\, Nb_2O_5$ | R ($\Omega \cdot cm$) |
|---|---|---|---|---|---|---|---|---|---|---|---|
| 1* | 94.5 | 4.0 | | 1.2 | 0.30 | 0.3 | | | | | 70 |
| 2* | 91.3 | 7.0 | 0.6 | 1.1 | 0.16 | | | | | | 95 |
| 3* | 94.6 | 4.3 | 0.3 | 0.5 | 0.12 | 0.1 | | | 0.2 | | 139 |
| 4* | 89.8 | 8.3 | 0.6 | 1.2 | 0.14 | | | | 0.1 | | 165 |
| 5 | 93.0 | 5.4 | 0.6 | 0.5 | 0.09 | | | 0.2 | 0.3 | 0.2 | 221 |
| 6 | 94.0 | 4.4 | 0.3 | 0.9 | 0.20 | | | 0.2 | 0.2 | 0.2 | 217 |
| 7 | 92.8 | 5.5 | 0.4 | 0.9 | 0.16 | | 0.3 | | 0.1 | 0.5 | 335 |
| 8 | 94.1 | 4.0 | 0.3 | 0.9 | 0.23 | | | 0.5 | 0.2 | 0.5 | 334 |
| 9 | 92.9 | 5.1 | 0.5 | 0.8 | 0.16 | | | 0.6 | 0.1 | 0.6 | 376 |
| 10 | 94.8 | 3.2 | 0.2 | 0.7 | 0.22 | | | 0.6 | 0.5 | 0.6 | 249 |
| 11 | 94.1 | 4.0 | 0.1 | 0.7 | 0.18 | | | 0.7 | 0.4 | 0.7 | 680 |
| 12 | 93.8 | 4.1 | 0.5 | 0.8 | 0.20 | | | 0.7 | 0.1 | 0.7 | 390 |
| 13* | 93.3 | 3.6 | 0.3 | 0.7 | 0.19 | | | 0.7 | 1.4 | 0.7 | 63 |
| 14 | 94.5 | 3.9 | 0.3 | 0.8 | 0.21 | | 0.4 | | 0.1 | 0.7 | 325 |
| 15 | 93.3 | 4.6 | 0.4 | 0.7 | 0.15 | 0.1 | | 0.8 | 0.1 | 0.8 | 244 |
| 16 | 93.5 | 4.4 | 0.4 | 0.8 | 0.18 | | | 0.8 | 0.1 | 0.8 | 370 |
| 17 | 91.0 | 6.1 | 0.5 | 1.0 | 0.16 | | 0.1 | 0.8 | 0.5 | 1.0 | 273 |
| 18 | 94.1 | 4.0 | 0.3 | 0.9 | 0.22 | | 0.6 | | 0.1 | 1.0 | 558 |
| 19* | 96.3 | 1.5 | 0.2 | 0.9 | 0.57 | | | 1.0 | 0.2 | 1.0 | 95 |
| 20 | 93.6 | 4.1 | 0.3 | 0.9 | 0.21 | | | 1.1 | 0.1 | 1.1 | 526 |
| 21 | 90.4 | 6.6 | 0.7 | 0.9 | 0.14 | 0.1 | 0.3 | 0.6 | 0.4 | 1.1 | 346 |
| 22 | 93.2 | 4.4 | 0.3 | 0.9 | 0.19 | | | 1.2 | 0.1 | 1.2 | 528 |
| 23 | 93.5 | 4.6 | 0.2 | 0.8 | 0.18 | | 0.8 | | 0.1 | 1.3 | 648 |
| 24 | 94.4 | 3.7 | 0.2 | 0.9 | 0.23 | | 0.8 | | | 1.3 | 404 |
| 25 | 93.3 | 4.3 | | 0.9 | 0.20 | | | 1.4 | 0.1 | 1.4 | 436 |
| 26 | 93.3 | 3.5 | 0.3 | 0.7 | 0.20 | | | 1.4 | 0.8 | 1.4 | 204 |
| 27 | 93.8 | 4.1 | | 0.8 | 0.20 | | 0.3 | 0.9 | 0.1 | 1.4 | 359 |
| 28 | 88.1 | 8.4 | 0.6 | 1.2 | 0.15 | | | 1.6 | 0.1 | 1.6 | 456 |
| 29 | 93.0 | 4.6 | 0.3 | 0.9 | 0.20 | | 0.6 | 0.6 | | 1.6 | 477 |
| 30 | 92.2 | 5.0 | 0.4 | 0.7 | 0.14 | | 0.3 | 1.2 | 0.2 | 1.7 | 373 |
| 31 | 89.4 | 6.8 | 0.5 | 1.4 | 0.20 | | | 1.7 | 0.2 | 1.7 | 448 |
| 32 | 93.4 | 4.0 | 0.3 | 0.8 | 0.20 | | 0.8 | 0.5 | 0.2 | 1.8 | 427 |
| 33 | 92.3 | 4.5 | | 1.0 | 0.22 | | | 2.1 | 0.1 | 2.1 | 335 |
| 34 | 90.9 | 5.2 | 0.4 | 0.7 | 0.13 | | 0.2 | 2.0 | 0.6 | 2.3 | 360 |
| 35 | 92.5 | 4.4 | 0.4 | 0.7 | 0.16 | | 1.5 | | 0.5 | 2.5 | 261 |
| 36 | 91.5 | 4.7 | 0.4 | 0.8 | 0.16 | | 0.3 | 2.1 | 0.2 | 2.6 | 253 |
| 37 | 96.9 | 1.5 | 0.3 | 0.5 | 0.33 | | 0.7 | | 0.1 | 1.2 | 356 |
| 38 | 90.2 | 7.4 | 0.9 | 0.3 | 0.04 | | | 1.2 | | 1.2 | 322 |

TABLE 1-continued

| | $ZrO_2$ | $SiO_2$ | $B_2O_3$ | $Al_2O_3$ | $Al_2O_3/SiO_2$ | $Na_2O$ | $Nb_2O_5$ | $Ta_2O_5$ | $Y_2O_3$ | $Ta_2O_5 +$ $1.66$ $Nb_2O_5$ | R ($\Omega \cdot cm$) |
|---|---|---|---|---|---|---|---|---|---|---|---|
| 39 | 86.5 | 8.8 | 1.4 | 1.5 | 0.17 | | | 1.8 | | 1.8 | 480 |
| 40 | 94.0 | 3.7 | 0.3 | 0.8 | 0.22 | | | 1.2 | | 1.2 | 448 |
| 41 | 94.9 | 3.5 | 0.3 | 0.8 | 0.23 | | 0.5 | | | 0.8 | 460 |
| 42 | 94.6 | 3.6 | 0.2 | 0.8 | 0.22 | | 0.8 | | | 1.3 | 429 |
| 43 | 93.3 | 4.2 | 0.3 | 1.1 | 0.26 | | 0.5 | 0.6 | | 1.4 | 370 |

These examples show that adding dopants can significantly increase the electrical resistivity of fused and cast refractory products with a high zirconia content when the total weighted dopant content ($Ta_2O_5+1.66Nb_2O_5$) is more than 0.2%, preferably more than 0.5% as a percentage by weight relative to the oxides. The products of the invention thus have an electrical resistivity of more than 200 ohm.cm.

The examples of Table 1 also show the molar equivalence of the various dopants. This equivalence is especially clear if the values ($Ta_2O_5+1.66Nb_2O_5$) and the resistivity R of Examples 7 and 8 or 12 and 14 are compared.

Other tests have shown that when the total weighted dopant content is increased beyond 3% by weight, no additional increase in electrical resistivity is obtained. It is more preferable to limit the total weighted dopant content to 3% by weight so that the percentage of zirconia is maintained at a sufficiently high level to ensure excellent resistance to corrosion by the molten glass.

The examples, in particular example 23 which corresponds to the preferred composition, also show that the effect of adding dopant is a maximum when the total weighted dopant content is in the range 0.5% to 2% as a percentage by weight.

Example 19* and a comparison of Examples 9 and 10 or 23 and 24 indicate that increasing the silica content is favorable for improving the electrical resistivity of the products. The silica content must thus be greater than 2%, preferably greater than 3% as a percentage by weight relative to the oxides.

It should also be noted that it is advantageous for the products to present a quantity of $B_2O_3$ that is more than 0.05%, preferably more than 0.1%, or even more than 0.2%, in particular when $SiO_2<3\%$.

Example 13*, a comparison of Examples 23 and 24 and to a lesser extent Example 26 indicate that an increase in the yttrium oxide content is deleterious if the electrical resistivity of the products is to be improved.

It should also be noted that it is preferable to limit the $Na_2O$ content to values of 0.1% or less, preferably 0.05% or less. Preferably, the product of the invention includes only traces of $Na_2O$. As can be seen by a comparison of Examples 15 and 16, the presence of sodium oxide $Na_2O$ has a deleterious effect on the electrical resistivity due to the low resistivity of the vitreous phase.

Finally, it can be observed from Examples 40 to 43 that using an induction furnace also results in good electrical resistivity. Other tests have also shown that, surprisingly, the use of an induction furnace with continuous fusion and solidification, as described in FR 1 430 962, can produce products with a particularly homogeneous zirconia content.

Further, other tests have shown that the other recognized properties of high zirconia content materials, in particular resistance to corrosion by glass, are not degraded by the presence of a dopant in accordance with the invention.

The products of the invention may advantageously be used in any other application requiring a refractory product having a high electrical resistivity. In particular, such products may be used to construct aluminum electrolysis cells in which aluminum metal can be produced on an industrial scale by electrolysis of alumina in solution in a cryolite-based melt.

The electrolyte is conventionally contained in an electrolysis cell. The cell comprises a side wall and a base. The base is composed of refractory base blocks and cathode blocks with insulating blocks at the lower portion. The side wall is formed from refractory side blocks surrounded by a metal envelope or casing which is insulated to a greater or lesser extent.

The blocks are used at temperatures of 950° C. or less.

The electrical resistivity at 950° C. of Example 18 of the invention was thus compared with that of a reference block based on silicon carbide (SiC) bonded by a silicon nitride ($Si_3N_4$) matrix using the same protocol as above, but at a temperature of 950° C.

The electrical resistivity at 950° C. of Example 18 was 30000 $\Omega$.cm, while that of the reference block was 6000 $\Omega$.cm.

The resistance to corrosion by cryolite was evaluated by keeping samples with a cross section of 25 mm×25 mm of Example 18 and the reference block in a cryolite melt for 22 hours at 1030° C.

The sample of Example 18 had a corroded volume (reduction in volume due to corrosion) which was half that of the reference block.

The refractory products of the invention are thus entirely suitable for use in an electrolysis cell, in particular for aluminum, more particularly as an element of a side wall of said cell and/or in a zone where they can come into contact with molten cryolite.

Clearly, the present invention is not limited to the embodiments described and shown by way of non-limiting illustrative examples.

The invention claimed is:

1. A fused and cast refractory product with a high zirconia content comprising, as percentages by weight relative to the oxides and for a total of more than 98.5%:

| | |
|---|---|
| $ZrO_2 + Hf_2O$: | >85% |
| $SiO_2$: | 1% to 10% |
| $Al_2O_3$: | 0.1% to 2.4% |
| $B_2O_3$: | >1.5%; and | a dopant selected from the group consisting of $CrO_3$, $Nb_2O_5$, $MoO_3$, $Ta_2O_5$, $WO_3$, and mixtures thereof, in a weighted quantity such that:

$0.2\% \leqq (8.84)CrO_3+(1.66)Nb_2O_5+(6.14)MoO_3+Ta_2O_5+(3.81)WO_3$.

2. The refractory product according to claim 1, wherein said weighted quantity is such that:

$0.2\% \leqq (4.42)CrO_3+(1.66)Nb_2O_5+(3.07)MoO_3+Ta_2O_5+1.91)WO_3$.

3. The refractory product according to claim 1, wherein the quantity of silica $SiO_2$ is 2% or more.

4. The refractory product according to claim 1, wherein the $Al_2O_3/SiO_2$ weight ratio is less than 0.5.

5. The refractory product according to claim 4, wherein the $Al_2O_3/SiO_2$ weight ratio is less than 0.3.

6. The refractory product according to claim 1, wherein the weighted quantity of dopant is 0.5% or more, and 3% or less.

7. The refractory product according to claim 1, wherein the weighted quantity of dopant is 0.6% or more and 1.4% or less.

8. The refractory product according to claim 1, wherein the dopant is selected from the group consisting of $Nb_2O_5$, $Ta_2O_5$, $WO_3$ and mixtures thereof.

9. The refractory product according to claim 1, wherein the dopant is selected from the group consisting of $Nb_2O_5$, $Ta_2O_5$ and mixtures thereof.

10. The refractory product according to claim 1, wherein the quantity of silica, $SiO_2$, is 3% or more and 8% or less.

11. The refractory product according to claim 1, wherein the quantity of $B_2O_3$ is more than 0.05% and less than 1%.

12. The refractory product according to claim 11, wherein the quantity of $B_2O_3$ is more than 0.1%.

13. The refractory product according to claim 11, wherein the quantity of $SiO_2$ is less than 3%.

14. The refractory product according to claim 1, wherein the quantity of $Y_2O_3$ is 1% or less.

15. The refractory product according to claim 1, having an electrical resistivity of at least 200 Ω.cm at 1500° C. and/or at least 10000 Ω.cm at 950° C.

16. The refractory product according to claim 1, having an electrical resistivity of at least 400 Ω.cm at 1500° C. and/or at least 25000 Ω.cm at 950° C.

17. The refractory product according to claim 1, having an alumina ($Al_2O_3$) content of 1% or less, as a percentage by weight based on the oxides.

18. The refractory product according to claim 17, having an alumina ($Al_2O_3$) content of 0.85% or less, as a percentage by weight based on the oxides.

19. The refractory product according to claim 1, having a $Na_2O$ content of less than 0.1%.

20. The refractory product according to claim 1, having the following composition, wherein $ZrO_2+HfO_2$ and the impurities form the complement to 100%:

| | |
|---|---|
| $SiO_2$: | 3.8% to 4.8% |
| $B_2O_3$: | <0.25% |
| $Al_2O_3$: | 0.65% to 0.85% |
| $Y_2O_3$: | <0.45% |

0.8% to 1.2% of $Ta_2O_5$ or 0.4% to 0.9% of $Nb_2O_5$.

21. A process for fabricating a refractory product, comprising the following steps:
   a) mixing starting materials to form a starting charge,
   b) fusing said starting charge to obtain a molten liquid,
   c) casting and solidifying said molten liquid by controlled cooling to obtain a refractory product,
   wherein said starting materials are selected so that the refractory product is in accordance with claim 1.

22. The process according to claim 21, wherein the fusing step is carried out in oxidizing condition.

23. The process according to claim 21, wherein the fusing step is carried out with an induction furnace or with a long arc.

24. The process according to claim 21, wherein, at step c), cooling is carried out at a rate lower than 20° C. per hour.

25. A glass fusion furnace, comprising a refractory product according to claim 1.

26. The furnace according to claim 25, said refractory product forming a part of a cell for preparing the glass by electrical fusion, where it may come into contact with molten glass at a temperature higher than 1200° C.

27. An electrolysis cell comprising a plurality of refractory blocks, wherein at least one of said blocks is a refractory product according to claim 1.

28. The cell according to claim 27, wherein said refractory product may come into contact with molten cryolite.

29. The cell according to claim 27, wherein said refractory product forms part of the side wall of the cell.

30. The refractory product according to claim 1, wherein $Na_2O \leq 0.1\%$.

31. The refractory product according to claim 30, wherein $Na_2O \leq 0.5\%$.

* * * * *

UNITED STATES PATENT AND TRADEMARK OFFICE
CERTIFICATE OF CORRECTION

PATENT NO. : 7,687,422 B2
APPLICATION NO. : 12/280166
DATED : March 30, 2010
INVENTOR(S) : Yves Boussant-Roux et al.

Page 1 of 1

It is certified that error appears in the above-identified patent and that said Letters Patent is hereby corrected as shown below:

Change Claim 1, column 8, line 57 from "$B_2O_3: > 1.5\%;$ and" --to-- "$B_2O_3: < 1.5\%;$"

Signed and Sealed this
Third Day of July, 2012

David J. Kappos
*Director of the United States Patent and Trademark Office*